US012574470B2

(12) United States Patent
Gehring et al.

(10) Patent No.: US 12,574,470 B2
(45) Date of Patent: Mar. 10, 2026

(54) OPTICALLY READABLE CODES IN A CONTENT DELIVERY SYSTEM

(71) Applicant: Comcast Cable Communications, LLC, Philadelphia, PA (US)

(72) Inventors: Shaun Gehring, Warminster, PA (US); Jason Smith, Orwigsburg, PA (US); Michael J. Cook, Flemington, NJ (US); Bruce Bradley, Wayne, PA (US); Daniel T. Grady, Audubon, NJ (US); Charlie Herrin, Wayne, PA (US); Robert Philibert, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/769,037

(22) Filed: Jul. 10, 2024

(65) Prior Publication Data

US 2024/0364842 A1 Oct. 31, 2024

Related U.S. Application Data

(63) Continuation of application No. 17/968,149, filed on Oct. 18, 2022, now Pat. No. 12,069,403, which is a (Continued)

(51) Int. Cl.
    *H04N 5/782*     (2006.01)
    *G06F 16/955*     (2019.01)
    (Continued)

(52) U.S. Cl.
    CPC ......... *H04N 5/782* (2013.01); *G06F 16/9554* (2019.01); *H04N 21/274* (2013.01);
    (Continued)

(58) Field of Classification Search
    CPC .......... G06F 16/9554; H04N 21/41265; H04N 21/274; H04N 21/47214; H04N 21/8586; H04N 5/772
    See application file for complete search history.

(56) References Cited

U.S. PATENT DOCUMENTS

| | | | |
|---|---|---|---|
| 8,639,681 | B1 | 1/2014 | Dyvadheenam et al. |
| 9,716,855 | B2 | 7/2017 | Gehring et al. |

(Continued)

OTHER PUBLICATIONS

Notion, "Work Journal Services About Recognition Contact", Aug. 5, 2010, <http://www.designbynotion.com/metamirror-next-generation-tv/{Sep. 13, 2012 11:24:28 AM]>, 5 pages.

(Continued)

*Primary Examiner* — Girumsew Wendmagegn
(74) *Attorney, Agent, or Firm* — Banner & Witcoff, Ltd.

(57) ABSTRACT

A method, apparatus, and software are provided for using an optically-readable code such as a quick-response (QR) code. The optically-readable code may represent a uniform resource identifier (URI) including parameters that represent a query, such as a query for content and/or other data. The query results may be used to command a content consumption device to record or otherwise obtain an item of content. The optically-readable code may additionally or alternatively be determined based upon a status of the device, such as what content, or portion thereof, is currently being displayed, and/or what error condition is being experienced.

21 Claims, 9 Drawing Sheets

Related U.S. Application Data continuation of application No. 17/125,167, filed on Dec. 17, 2020, now Pat. No. 11,509,855, which is a continuation of application No. 15/626,704, filed on Jun. 19, 2017, now Pat. No. 10,904,475, which is a continuation of application No. 13/616,828, filed on Sep. 14, 2012, now Pat. No. 9,716,855.

(51) Int. Cl.

| | | |
|---|---|---|
| *H04N 21/274* | (2011.01) | |
| *H04N 21/41* | (2011.01) | |
| *H04N 21/472* | (2011.01) | |
| *H04N 21/858* | (2011.01) | |
| *H04N 5/77* | (2006.01) | |

(52) U.S. Cl.
CPC . *H04N 21/41265* (2020.08); *H04N 21/47214* (2013.01); *H04N 21/8586* (2013.01); *H04N 5/772* (2013.01)

(56) References Cited

U.S. PATENT DOCUMENTS

| | | |
|---|---|---|
| 10,904,475 B2 | 1/2021 | Gehring et al. |
| 11,509,855 B2 | 11/2022 | Gehring et al. |

| | | | |
|---|---|---|---|
| 2004/0246376 A1 | 12/2004 | Sekiguchi et al. | |
| 2008/0034421 A1 | 2/2008 | Ahn et al. | |
| 2009/0031373 A1* | 1/2009 | Hogyoku | H04N 21/2543 725/104 |
| 2012/0130851 A1 | 5/2012 | Minnick et al. | |
| 2012/0138671 A1 | 6/2012 | Gaede et al. | |
| 2012/0155838 A1 | 6/2012 | Gerhards et al. | |
| 2012/0159563 A1 | 6/2012 | Gomez et al. | |
| 2012/0211559 A1 | 8/2012 | Okuyama et al. | |
| 2012/0218471 A1 | 8/2012 | Gratton | |
| 2012/0222071 A1 | 8/2012 | Gaede et al. | |
| 2012/0316950 A1 | 12/2012 | LaPorte et al. | |
| 2013/0124186 A1 | 5/2013 | Donabedian et al. | |

OTHER PUBLICATIONS

Slingbox.com, "Watch Your TV Anywhere with a Slingbox", publication date unknown, but prior to Sep. 13, 2012, <http://www.slingbox.com/go/home[Sep. 13, 2012 11:17:51 AM], 1 page.

Directtv, Directtv News, "Tips & Tricks, Handy Pointers to Help You Get the Most from Your Directtv Service.", publication date unknown, but prior to Sep. 13, 2012, <http://www.directv.com/DTVAPP/global/articleCategoryIndex.jsp?assetId=P7260086&DPSLogout=true&_requestid=3328621[Sep. 13, 2012 11:21: 17 AM], 1 page.

* cited by examiner

200

300

Fig. 5
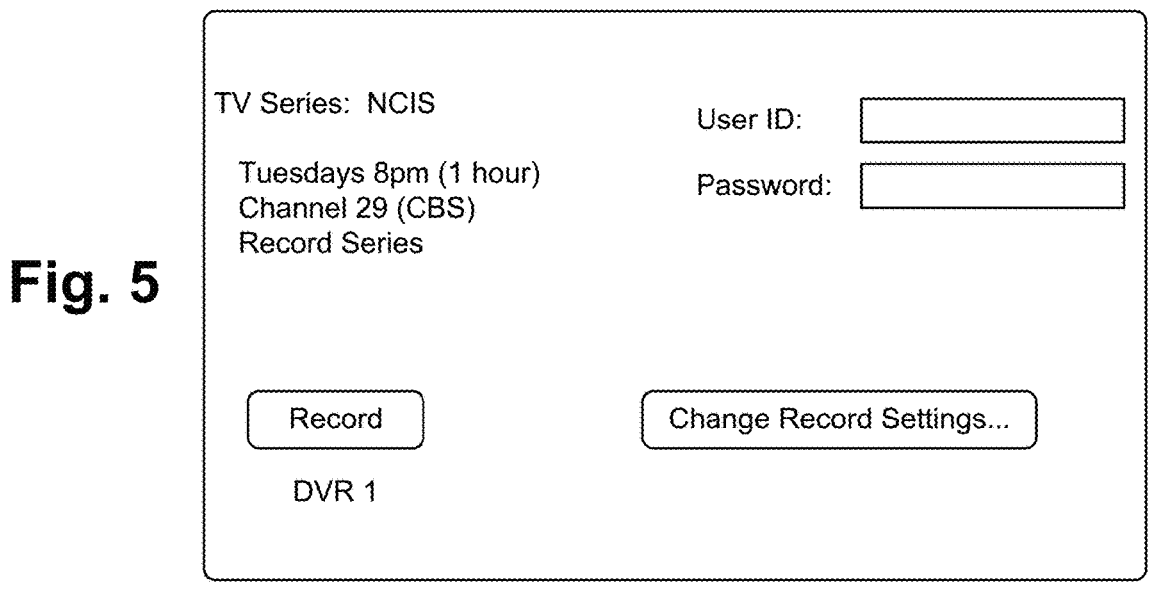
Video Segment A
Optically-readable code 1 | Video Segment B
Optically-readable code 2 | Video Segment C
Optically-readable codes 3 and 4
Fig. 6
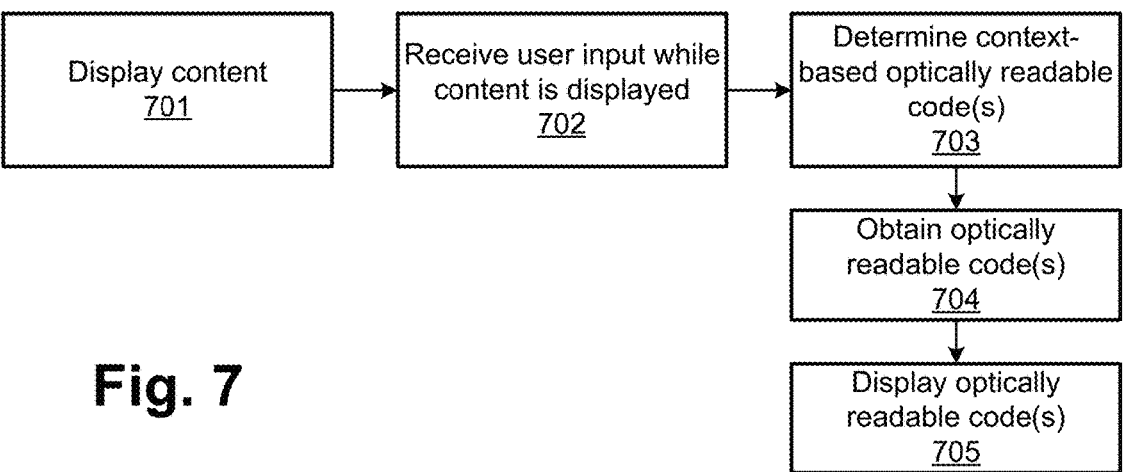
Fig. 7

User Device        Server        Content Consumption Device
Request device status code
1201
Determine status
1202
Generate and display optically readable code based on device status
1203
Read optically readable code
1204
Configure user device
1205
Interaction with server
1206
Send command to content consumption device
1207
Act on command
1208
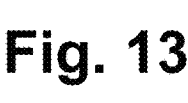
Fig. 12
Fig. 13

OPTICALLY READABLE CODES IN A CONTENT DELIVERY SYSTEM

CROSS-REFERENCE TO RELATED APPLICATIONS

The present application is a continuation of and claims priority to U.S. patent application Ser. No. 17/968,149, filed Oct. 18, 2022, which is a continuation of U.S. patent application Ser. No. 17/125,167, filed Dec. 17, 2020 (now U.S. Pat. No. 11,509,855), which is a continuation application of U.S. application Ser. No. 15/626,704, filed Jun. 19, 2017 (now U.S. Pat. No. 10,904,475), which is a continuation of U.S. application Ser. No. 13/616,828, filed Sep. 14, 2012 (now U.S. Pat. No. 9,716,855), each of which is hereby incorporated by reference in its entirety.

BACKGROUND

Quick-response (QR) codes are commonly used to supplement advertising and other informational content. QR codes represent website addresses, and so when a user of a device having a camera obtains an image of a QR code, the device may determine the encoded website address and direct a web browser to that address. While QR codes are useful for providing supplemental information in this way, their full potential has yet to be realized.

SUMMARY

According to some aspects as described herein, a user of a content consumption device, such as a smart phone, display device, audio system, gaming console, computer, set-top box, or digital video recorder, may be able to remotely program the content consumption device to record and/or otherwise obtain content by capturing an optically-readable code such as a quick response (QR) code using a different device such as a cellular phone having a camera. The optically-readable code may represent parameters that could be used in a query of a database sufficient to return one or more items of content as a result of the query. The database may associate a plurality of items of content with a plurality of characteristics, and the query may represent a uniform resource identifier (URI) including one or more parameters identifying one or more values of at least some of the characteristics. The query results may be returned via a website interface generated by a web server, and may, for instance, return one or more items of content. The user may then utilize the website to control the content consumption device to record or otherwise obtain the one or more items of content.

According to further aspects as described herein, the web server or another computer may receive the URI from the user device and perform a query of the database based on the parameters (e.g., passed parameters) included in or with the URI. As stated above, the query results may return one or more items of content. The web server may then indicate the one or more items of content on the website user interface for selection by the user device.

According to still further aspects as described herein, an advertiser may create the optically-readable code by determining the above-mentioned query sufficient to return the desired one or more items of content. The advertiser may, for instance, use a trial-and-error technique to determine the appropriate query, and may use as a starting point one or more known characteristics about the desired one or more items of content. Once the appropriate query is determined, an optically-readable code may be generated containing the query as parameters in a URI.

According to yet further aspects as described herein, an on-demand and/or context-sensitive optically-readable code may be displayed to the user of the content consumption device. The optically-readable code may depend upon a status of the content consumption device, such as which item of content (and/or which portion of the item of content) is currently being displayed or otherwise presented by the content consumption device, and/or an error condition being experienced by the content consumption device. Thus, for example, the content consumption device may determine a particular one or more optically-readable codes to be displayed that may be dependent upon the context of the item of content currently being presented to the user, or an error condition. Moreover, the optically-readable code may be displayed on-demand, e.g., in response to a user input indicating a desire to view information related to the optically-readable code, or in response to detecting the error condition. Thus, where the optically-readable code is presented on demand to the user, the user may not need to see the optically-readable code unless it is desired, which may in some cases help avoid confusion to some users and prevent blocking or reduction in size of video content in order to otherwise display the optically-readable code. In addition, the on-demand and/or contextual optically-readable code may be formatted in a manner as described above by representing a URI including parameters representing parameters in a database query.

According to still further aspects as described herein, a user device, such as a cellular phone, may be paired with a content consumption device using an optically-readable code. For instance, the content consumption device may display an optically-readable code containing status information such as an identity of the content consumption device, and the user device may read the optically-readable code and use the identity (and/or other information represented by the optically-readable code) in order to become authorized to control the content consumption device.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein:

FIG. 5 is an example screen shot that may be displayed in accordance with one or more aspects as described herein;

FIG. 6 is an example association between portions of content and optically-readable codes, in accordance with one or more aspects as described herein;

FIG. 7 is a flow chart of example steps that may be performed in accordance with one or more aspects as described herein;

FIG. 12 is yet another flow chart of example steps that may be performed in accordance with one or more aspects as described herein;

FIG. 13 is an example of an optically-readable code in accordance with one or more aspects as described herein;

DETAILED DESCRIPTION

Figure 1:
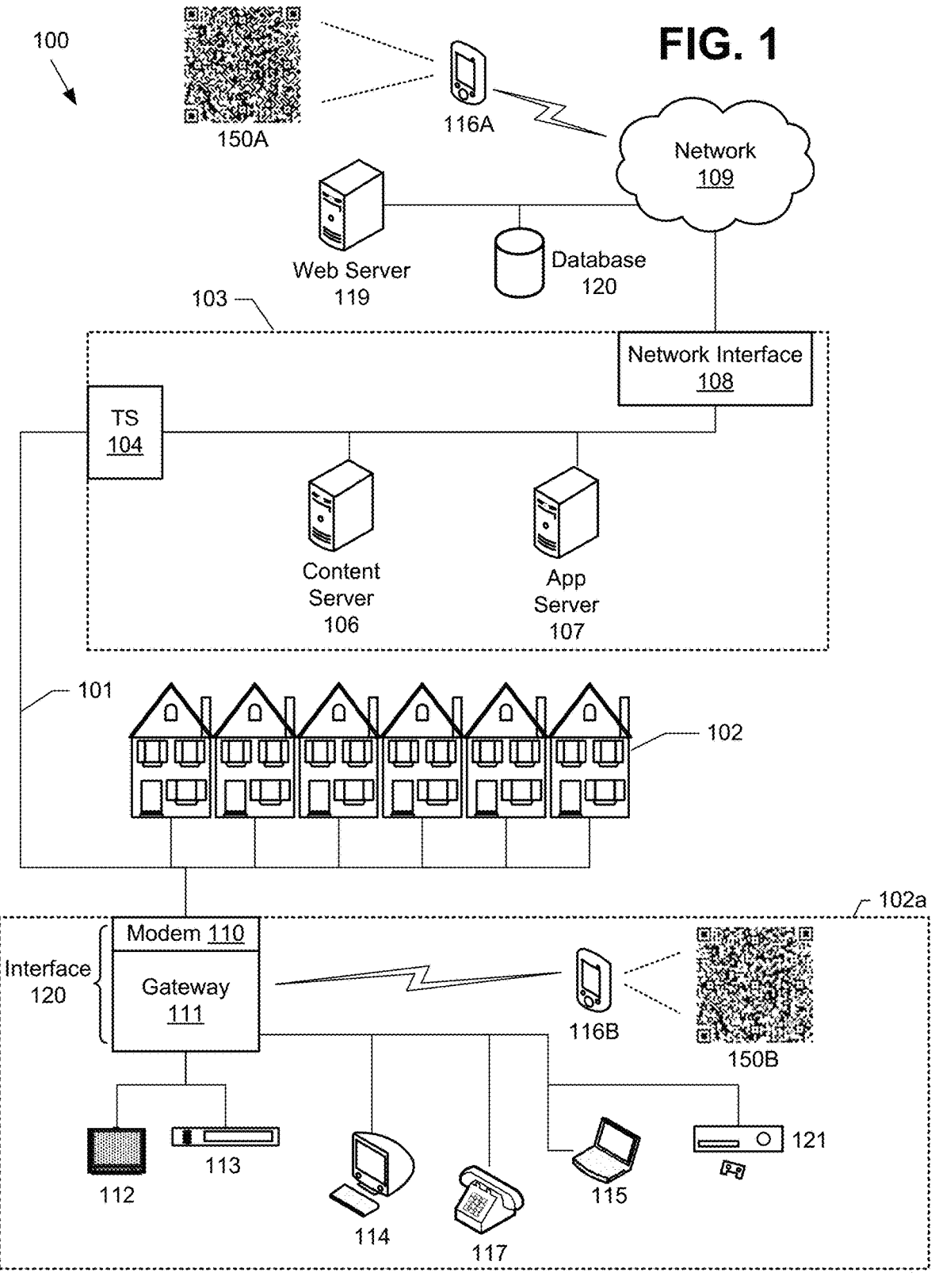
FIG. 1 illustrates an example network according to one or more aspects as described herein.

FIG. 1 illustrates an example network 100 on which many of the various features described herein may be implemented. Network 100 may be, or otherwise include, for example, any type of information access and/or distribution network, such as a satellite network, a landline network, a cellular telephone/data network or other wireless network, the Internet, a wide-area network, a local-area network, etc., or a combination or subcombination thereof. Some examples include an optical fiber network, a coaxial cable network, or a hybrid fiber/coax (HFC) distribution network. Such networks may use a series of interconnected communication links 101 (e.g., coaxial cables, optical fibers, hybrid fiber/coax, wireless links, etc.) to connect multiple homes 102 to a network equipment site 103 (which may be, e.g., a central office or headend, or other central location). The network equipment site 103 may transmit downstream information signals onto the links 101, and each home 102 may have a receiver used to receive and process those signals.

There may be one or more physical links 101, such as an electrically conductive line, originating from the network equipment site 103, which may be split a number of times to distribute the signal to various user locations 102 (e.g., homes, businesses, schools, institutions etc.) in the vicinity (which may be many miles) of the network equipment site 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The network equipment site 103 may include a termination system (TS) 104, such as a cable modem termination system (CMTS), which may be a computing device configured to manage communications between devices on the network of links 101 and backend devices such as servers 106-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or standards relating to various optical networks such as passive optical network (PON) networks, or it may be a similar or modified device instead. The TS may be configured to place data on one or more downstream channels or frequencies to be received by devices, such as modems at the various user sites 102 (e.g., homes or office buildings), and to receive upstream communications from those modems on one or more upstream frequencies. Because the network 100 provides services to user at the user sites 102, the network 100 may also be referred to as a service provider network.

The network equipment site 103 may also include one or more network interfaces 108, which can permit the network equipment site 103 to communicate with various other external networks 109. These networks 109 may include, for example, the Internet, telephone networks, cellular telephone networks, a PON or other type of fiber optic networks, local wireless networks (e.g., WiMAX), satellite networks, managed services networks, and/or any other desired network. These networks 109 may also be communicatively coupled to, e.g., one or more web servers 119 that are responsible for hosting Internet or Intranet web pages and/or one or more databases 120 (which may be implemented by web servers 119 and/or separately from web servers 119). The network interface 108 may include the corresponding circuitry and/or devices needed to communicate on the network 109, and to other devices coupled to the networks 109 such as a cellular telephone network and its corresponding cellular phones, such as cellular phone 116A and/or other user devices.

As noted above, the network equipment site 103 may include a variety of servers 106-107 that may be configured to perform various functions. For example, the network equipment site 103 may include a content server 106. The content server 106 may be one or more computing devices that are configured to provide content to users in the homes. This content may be, for example, multimedia content such as video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The network equipment site 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. Yet another application server may be responsible for inserting other information such as optically readable codes (e.g., quick response codes, also known as QR codes) into a video stream.

An example home or other location 102a may include a device 110, such as a modem, which may include transmitters and receivers used to communicate on the links 101 and with the network equipment site 103. The device 110 may be, for example, a coaxial cable modem (where the links 101 are or otherwise include coaxial cable lines at the customer premises), a fiber interface node (where the links 101 are or otherwise include fiber optic lines at the customer premises), or any other desired modem device. The device 110 may be connected to, or be a part of, a gateway device 111 (gateway 111). The modem 110 and/or the gateway 111, either alone or together, may be considered herein an example of an interface 120 that may provide the user's devices with network access. The modem 110 and the gateway 111 may be physically separate entities or integrated together as a single device, such as in a common housing and/or rack.

The interface 120 may be or otherwise include one or more devices such as customer premises equipment (CPE) devices. For instance, the interface 120 may be physically located in, or otherwise at, the residence, office, or other building of the user served by the interface 120. Any or all of local devices 112-117 may also be co-located with the interface 120, such as in the same building or campus as the interface 120.

The gateway 111 may be or otherwise include a computing device that communicates with modem 110 to allow one or more other devices in the home to communicate with the network equipment site 103 and other devices beyond the network equipment site. The gateway 111 may be or otherwise include, for example, a set-top box (STB), digital video recorder (DVR), computer server, local-area network (LAN) router, or any other desired computing device. The gateway 111 may include LAN interfaces to route and/or otherwise provide communication signals to/from local devices in the location 102a, such as one or more televisions 112, one or more DVRs or other types of content recorders 113, one or more personal computers 114 and/or 115, one or more wireless devices 116B (wireless laptops and netbooks, cellular phones, mobile televisions, personal digital assistants (PDA), etc.), one or more voice-over-IP (VOIP) phones 117, one or more gaming consoles 121, and any other desired devices. Examples of the LAN interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. While many of the user devices and/or content consumption devices are shown coupled to other portions of the system via links 101 and interface 120, any of these devices may be coupled to other portions of the system in any manner desired. For example, the devices for a given user may not be situated at a single location and may not be coupled to the network via the same interface. Moreover, any of these devices may be coupled to other portions of the system 109 without necessarily requiring an intervening interface device. As an example, cellular phone 116A is independently coupled to the network 109 without a separate interface device.

Figure 2:
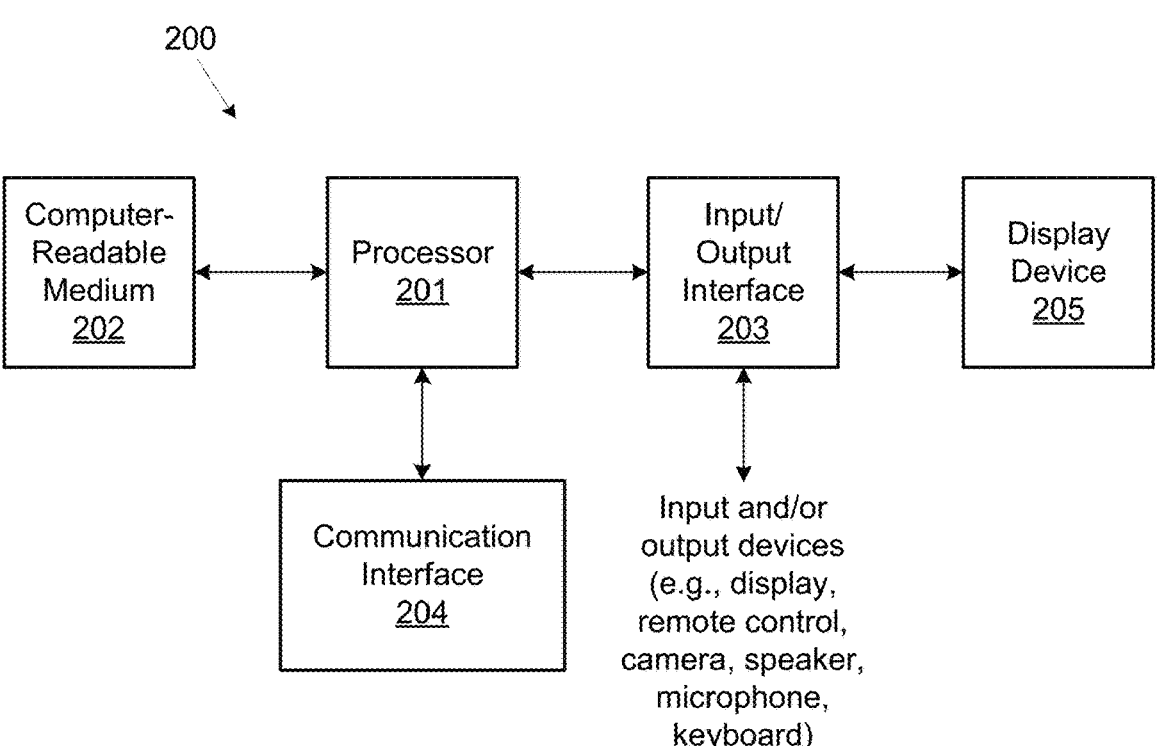
FIG. 2 is a functional block diagram of an example computing device that may embody or implement one or more elements or functions as described herein.

FIG. 2 illustrates an example of general hardware and/or software elements that can be used to partially or fully embody any of the various devices and functions discussed herein, such as any of those elements discussed herein with regard to FIG. 1. A computing device 200 (also often referred to as a computer) may include one or more processors 201, which may execute instructions of a computer program to perform any of the features described herein. The instructions may be stored in any type of tangible and/or non-transitory computer-readable medium 202, such as a memory or hard drive, to configure the operation of the processor 201. For example, instructions may be stored in a read-only memory (ROM), a random access memory (RAM), a removable media such as a Universal Serial Bus (USB) drive, compact disk (CD) or digital versatile disk (DVD), a floppy disk drive, an attached (or internal) hard drive, and/or any other desired data storage medium. The computing device 200 may include or be coupled to one or more output devices, such as a display device 205 (e.g., an external television, or a computer monitor), and may include one or more output device controllers, such as a video processor. The display device 205 may be physically separate from the computing device 200, or it may be integrated with the remainder of the computing device 200. There may also be one or more user input devices, such as a remote control, camera, keyboard, mouse, touch screen, microphone, etc. The computing device 200 may also include a communication interface 204, which may include one or more input and/or output circuits (e.g., in the form of a network card) to communicate with an external device or network (e.g., network 109). The communication interface 204 may be a wired interface, wireless interface, or a combination of the two. In some embodiments, such as where the computing device embodies the interface 120, the communication interface 204 may include modem 110 (e.g., a cable modem), and the network may include, for example, the communication links 101 discussed above, TS 104, external network 109, an in-home network, a provider's wireless, coaxial, fiber, or hybrid fiber/coaxial distribution system (e.g., a DOCSIS or PON network), and/or any other desired network.

Figure 3:
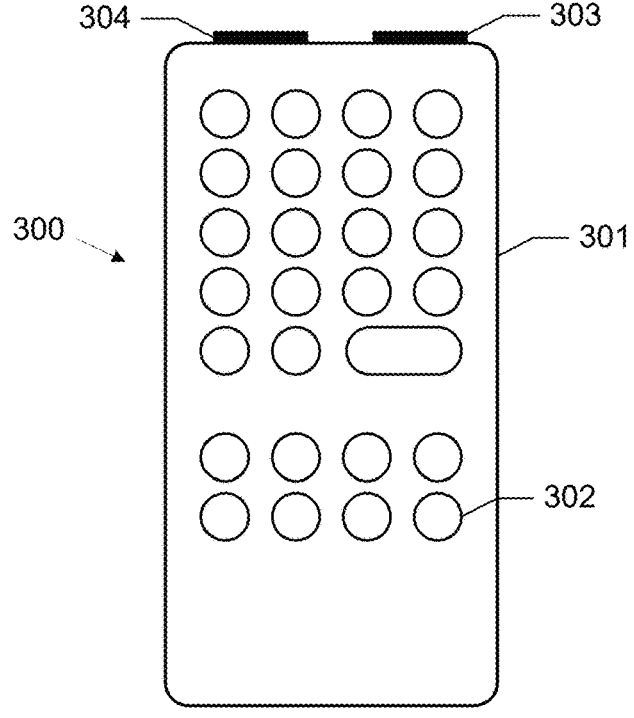
FIG. 3 shows a plan view of an example remote control according to one or more aspects as described herein.

FIG. 3 is a plan view of an example remote control 300 that may be used with, e.g., a the interface 120 and/or a content consumption device (e.g., DVR 113, computer 114, or gateway 111). Remote control 300 may be implemented as, for example, the above-mentioned remote control for use with computing device 200. In this example, remote control 300 may include a body (e.g., a housing) 301, on which one or more user input and/or output elements are exposed to the user. In this example, such elements may include one or more buttons, such as button 302. In addition, remote control 300 may include a wireless communication element 303 such as an infra-red and/or radio frequency (e.g., BLUETOOTH) emitter for unidirectional or bidirectional wireless communication with another device, such as gateway 111. Alternatively, remote control 300 may communicate with another device via a wired connection. Remote control 300 may also include a camera 304 for obtaining an optical image.

In some embodiments, remote control 300 may be a dedicated or specialized remote control device. In other embodiments, remote control 300 may be embodied as a portion of another device or as a function of a device having larger functionality. For example, cellular phone 116B or another mobile device may include, or otherwise be used as, remote control 300. In any of these embodiments, remote control 300 may further be implemented as a computing device such as computing device 200. Thus, in some embodiments, wireless communication element 303 may be implemented as communication interface 204. Moreover, where remote control 300 includes communication interface 204, remote control 300 may be capable of communicating (in a wired and/or wireless manner) with other devices or networks, such as network 109.

As will be described further, a device under the control of a user, such as remote control 300, cellular phone 116A, cellular phone 116B, or laptop 115, may be used to obtain an image of an optically readable code, and to take a particular action based on the obtained image. An optically readable code may be embodied as a printed pattern on a substrate (such as paper, cardboard, wood, or plastic) or as a displayed pattern (such as on a display device) viewable by a camera and/or by a human eye, and may encode or otherwise contain information that may be interpreted by a computer and/or by a human. Examples of an optically readable code include, but are not limited to, a QR code, a bar code, a dot array code, or a code using some other patterning of symbols. Moreover, the optically readable code may be formatted such that a human typically may not be able to read the code. For instance, the code and/or the parameters encoded by the optically-readable code may not be formatted in any human language (a non-human-language code), but rather in a machine-readable language. Thus, for example, the parameters represented by an optically-readable code may not be represented as plain letters, numbers, and/or other characters in a human-language text format.

Two example instances of QR codes are shown in FIG. 1: elements 150A and 150B. In these examples, the QR codes 150A and 150B are two-dimensional codes using two colors (black and white). However, an optically readable code such as a QR code may be a one-dimensional code, a two-dimensional code, or a three-dimensional code (e.g., a holographically printed or displayed code), and may encode information using two or more colors. Moreover, while a particular format of QR code is shown in FIG. 1, there are several other conventionally-known QR code formats that use multiple colors and/or other encoding patterns, and there will likely be new QR code formats developed in the future. The present discussion is not limited to any particular QR code format, or any particular format of any other type of optically readable code. Thus, any references herein to a specific format of optically readable code are merely by way of example.

As will be discussed below by way of example, an optically readable code may be imaged by any device under the user's control having a camera, such as cellular phone 116A, cellular phone 116B, or laptop 115. The image may be interpreted by the device to obtain the information encoded by the optically readable code. Software applications for interpreting optically readable codes such as QR codes are well known.

The information encoded by the optically readable code may represent, e.g., a universal resource indicator (URI) such as a universal resource locator (URL). The device may execute web browser software that is capable of browsing to the URI indicated by the optically readable code. For example, the device may send a hypertext transfer protocol (HTTP) request over network 109 to a domain name server (DNS) that serves a packet-switched network such as the Internet. The DNS may then direct the device to an Internet Protocol (IP) address associated with the URI. The IP address may be the IP address of a server, such as web server 119, that provides a desired web site.

The URI encoded by the optically readable code may further include one or more parameters (e.g., passed parameters). As will be discussed below, the parameters may provide the basis for a query associated with the web site. The query may be sent to a database, such as database 120, and the database may return results of the query back to the server. The query results may be used to customize the content provided to the user's device by the website. As will be further described below by way of example, the parameters may together represent a query of a database of content selections, such as audio and/or video content (e.g., files and/or streams), television programs, movies, on-demand content, etc. Moreover, the results of the query, which may indicate a selected content item, may be used to send a command to a media recording device (such as a DVR) to record the selected content. The term "content" as used herein may include, for instance, content that comprises audio, video, and/or other data such as closed captioning information and/or other metadata, and/or that includes three-dimensional video content. The term "video content" as used herein may include solely video (including two-dimensional and/or three-dimensional video content), and may further include content that comprises video in addition to one or more other types of content such as audio and/or the above-mentioned other data.

Figure 4:
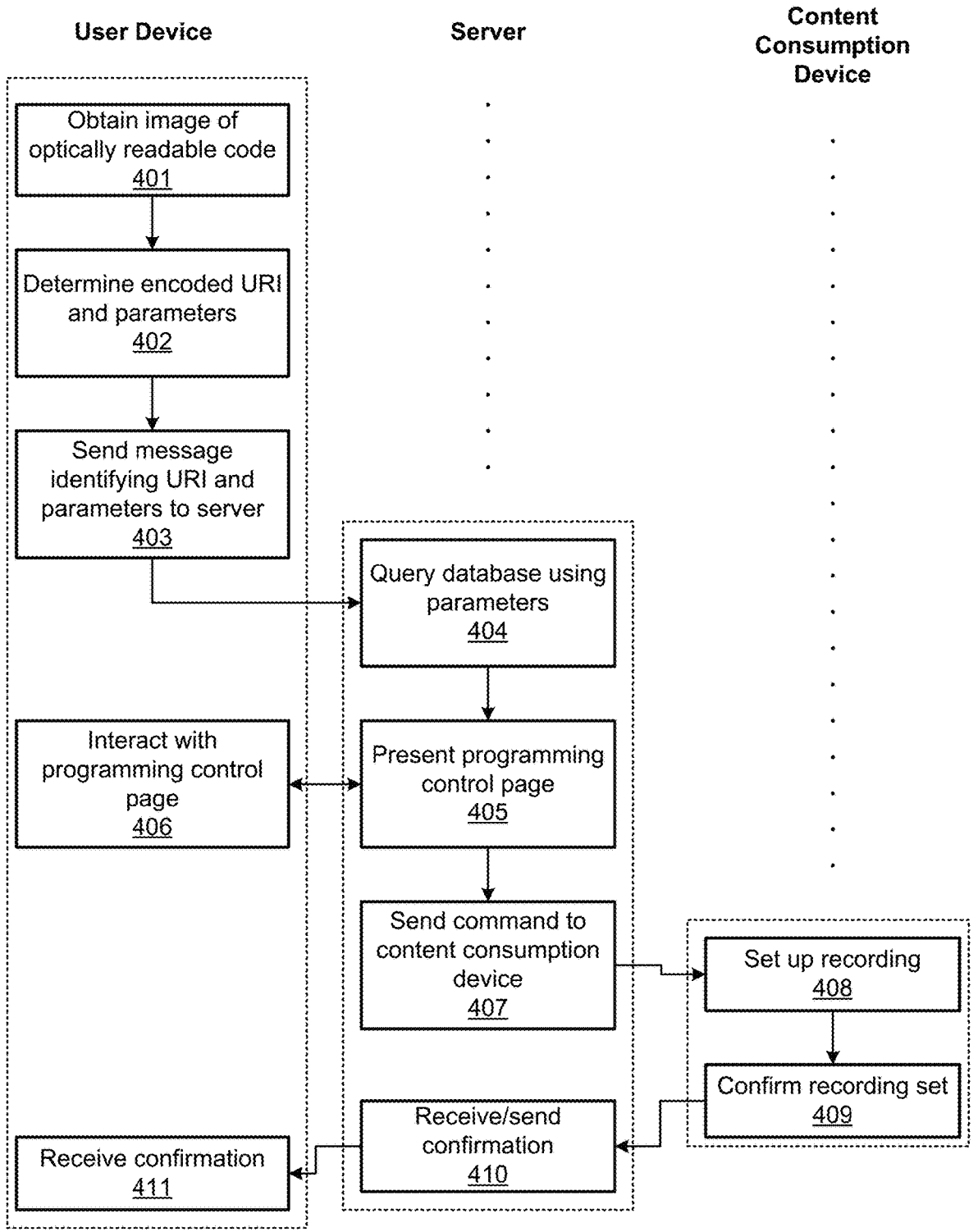
FIG. 4 is a flow chart of example steps that may be performed in accordance with one or more aspects as described herein.

FIG. 4 is a flow chart of example steps that may be performed in accordance with one or aspects as described herein. In this example, the steps may be variously performed by a user device having a camera (e.g., cellular phones 116A or 116B, or remote control 300), one or more servers (e.g., web server 119), and/or a content consumption device (e.g., display device 205, DVR 113, computer 114, or gateway 111). At step 401, the user device may be used to obtain an image of an optically readable code with the camera of the user device. The optically readable code may be encountered by the user on any media in any environment, at home or outside the home. For example, the optically readable code may be printed on a substrate such as on a conventional highway billboard, on a poster, in a magazine, in a newspaper, or in a book, or displayed such as on a website, a video billboard, or on another type of electronic advertisement display.

The optically readable code may encode information related to the environment (e.g., substrate) on and/or in which the optically-readable code is presented. For example, a printed advertisement for a particular television series may include an optically readable code that encodes a URI containing parameters sufficient to define a query, such that the query would result in one or more episodes of the television series (or the entire series) being the selected content. Thus, in this example, the user device may obtain an image of the optically readable code, and in response the user device's web browser may be automatically directed to a query result of a web site, where the query result has selected the one or more episodes of the television series. The user's content consumption device (e.g., a smart phone, audio system, DVR, set-top box, display device, or computer) may then be commanded to record, tune to, display or otherwise present (e.g., via audio speakers), obtain, and/or otherwise process the selected one or more items (e.g., items of video content). This may all occur even though the user may be physically remote from the content consumption device.

As an example, suppose the user is walking and sees a billboard advertisement for the television series, "30 Rock" that includes an optically-readable code. The user may pull out the user's mobile device (e.g., smart phone) and take a picture of the optically-readable code using a software application for reading optically-readable codes, such as a QR code reader application. The optically-readable code may include the parameters representing values of characteristics, where if a query included the values, the query would be sufficient to return an item of content (in this case, the series "30 Rock" or an episode thereof) as a result of the query. For instance, the characteristics may include the title of the series ("30 Rock") or of an episode of the series, the start time of the series, the recording time, the channel on which the series will be presented, the day and/or date of the series, the frequency of presentation of the series, etc.

Thus, returning to FIG. 4, at step 402 the user device (e.g., the optically-readable code reader application) may interpret the image of the optically readable code as discussed above to extract the encoded URI and/or the included parameters. The parameters may be appended to the path of the URI, such as in the form of a query string in accordance with the syntax set forth in RFC 3986. For example, the optically readable code may represent the following URI with parameters:

> https://secure.api.company.com/widgets/stage/dvr/
>   search/Fseries/program?search
>     Value=D7705238&searchLimitDays=7&maxResults=25&api_key=synddemo Thus, the URI in this example may include a name of a web server ("secure.api.company.com"), a path in the server ("/widgets/stage/dvr/search/Fseries/program"), and various parameters along with the values of those parameters beginning after the "?" character. In the above example, the parameters may indicate that the value of the search Value parameter is D7705238, the value of the searchLimitDays parameter is 7, the value of the maxResults parameter is 25, and the value of the api_key parameter is synddemo. In more general terms, the parameters may take the form of, e.g., parameter1=value1¶meter2=value2&parameter3=value3, etc. This is but one example of how parameters may be included in a URI. Another example may be to use standard percent-encoding of reserved characters in the query string rather than directly using reserved characters such as "?", "/", and "=".

Next, the URI may be browsed-to by the web browser of the user device. This may involve a DNS lookup, and once the URI is resolved by the DNS, in step 403 a message (such as an HTTP message) may be directed by the user device over a network such as the Internet to the appropriate server (e.g., web server 119) associated with the resolved URI. The message may include the URI and/or the parameters.

Examples of parameters that may be passed to the server (and utilized in a query) may include the title of a desired item of content, a key word, a content type (e.g., television program, series, movie, on-demand content), a length or range of lengths, a start time or range of start times (which may include date, day, week, month year, and/or time of day), a frequency of showings or set of frequencies of showings (e.g., weekly, monthly), a rating or set of ratings (e.g., G rated, PG-13 rated), a channel or set of channels, a content provider or set of content providers (e.g., NBC, CBS, HBO), a search time range, and a maximum number of results. These are merely examples; other types of parameters may additionally or alternatively be passed and utilized in a query.

At step 404, the server to which the message was directed may receive the message and cause a query of a database (such as database 120), using the parameters, to be performed. The parameters may be combined as appropriate, such as by Boolean ANDing each parameter value definition together. For instance, if the URI in the message is as shown in the example above, the query may define the values of the parameters as follows: (search Value=D7705238 AND searchLimitDays=7 AND maxResults=25 AND api_key=synddemo).

The results of the query may be returned to the server, and the server may present (at step 405) a user interface referred to herein as a programming control page (such as a web page) to the user device. An example of such a programming control page is shown in FIG. 5. The programming control page may be presented by the server as, e.g., an HTML page, and may present results of the query performed at step 404. In the present example, the programming control page may show that the query returned the result of a TV Series entitled, "NCIS," along with the showing frequency, time, length, channel, and content provider (in this example, Tuesdays, starting at 8 pm, length one hour, channel 29, CBS). The programming control page may also show a recommended recording command—in this case, record the series. Upon logging in to the user's account with a user ID and password (to prevent unauthorized access to the user's content consumption device), the user may select the Record button if the user would like to cause the current recording command (record series) to be performed for the indicated television series. The recording command may also include other default settings, such as that the recording start time will be at the time that the indicated content begins and will last for the indicated content length. If the user wishes to change any of these settings, the user may select the Change Record Settings button to do so. The user may also select a particular content consumption device is there are multiple such devices associated with the user's account.

Thus, at step 406, the user may interact with the programming control page by modifying settings and/or selecting a command such as Record. Responsive to the user selecting the Record button of the programming control page, at step 407 the server may detect this and cause a command to be sent to the content consumption device associated with the user's account. The command may be sent over a network such as network 109. In the above example, the command may include a record command including the details of the recording to be made (e.g., an indication of which content is to be recorded, the time that the recording should begin, the length of the recording, the channel, etc.). In further embodiments, the user may select that the command be a "tune to" command rather than a record command, such that the content consumption device tunes to the selected content at the appropriate time without recording the content.

At step 408, the content consumption device may receive the command and set up a scheduled future recording of the indicated content (or a scheduled future tuning to the indicated content). At step 409, the content consumption device may send a confirmation message back to the server that the command has been successfully received and interpreted, and/or that the recording or tuning has been scheduled. At step 410, the server may receive the confirmation message from the content consumption device, and in response may provide, at step 411, an indication (such as via the programming control page) to the user device of the confirmation.

In various examples discussed above, the URI as well as the parameters passed therein may be encoded in an optically readable code such as a QR code. While the optically-readable code may be printed on a physical substrate such as a billboard or magazine, the optically-readable code may alternatively be presented on a display device such as a television or a computer display. For example, a QR code or other optically readable code may be caused to be displayed by the content consumption device (e.g., DVR 113, television 112, gateway 111, or computer 114). Moreover, the content consumption device may be configured to display an optically readable code responsive to a user input indicating a desire to view the optically readable code, and to otherwise not display the optically readable code. This may be useful where, for instance, the optically readable code that is to be displayed depends upon the content currently being rendered/displayed or otherwise presented by the content consumption device. For example, referring to FIG. 6, an item of content may be divided into a plurality of portions, each portion being associated with one or more optically-readable codes. In this example, a first portion (Video Segment A) is associated with an optically readable code (designated in the figure as optically-readable code 1), a second portion (Video Segment B) is associated with a different optically readable code (designated in the figure as optically-readable code 2), and a third portion (Video Segment C) is associated with still other optically readable codes (designated in the figure as optically-readable codes 3 and 4).

Such on-demand and/or context-sensitive optically-readable codes may provide a useful service to the user in a variety of ways. For example, where the content includes advertisements, there may be a different one or more optically readable codes associated with each of the advertisements. A user request for the context-sensitive optically-readable code may result in one or more optically-readable codes relevant to the advertisement currently being presented to the user. Once the optically-readable code is displayed, the user may use a user device, such as cellular phone 116B, by pointing the camera of the user device toward the display device and obtain an image of the optically-readable code. In response, the user device may browse to the web page indicated by the optically-readable code to obtain information about the advertised product or service.

As another example, the content may involve a contest or other user-interactive feature. For instance, the content may be video content of a dance competition amongst three contestants, where the viewers of the content are allowed to vote for the winner. In this case, a user request may result in an on-demand display of a separate optically-readable code representing information about and/or a vote for the respective contestant. Obtaining the image of the desired one of the displayed optically-readable codes by the user device may result in the user device browsing to an appropriate web page indicated by the optically-readable code. This may provide the user with additional information about the contestant and/or allow the user to register a vote for the competitor.

As yet another example, a sports game (e.g., baseball or basketball) may be the content being presented (e.g., the video content being displayed). When optically-readable codes are summoned by the user, the codes may represent web pages containing information about the players. The particular codes displayed may depend upon which of the players are currently playing, which is/are currently in possession of the ball, which is/are currently being discussed by the sports commentator, etc., at the time that the user request is made. In some cases, especially where the content is live content rather than pre-recorded content, the optically-readable codes may not be predetermined until immediately prior to the viewing of the optically-readable codes by the user. In such a case, the optically-readable codes may be determined in real-time, such as by a human operator.

As still another example, the context-sensitive displayed optically-readable code may represent a database query designed to return another item of content for recording, such as described previously in connection with the example of FIG. 4. Decisions as to which optically-readable codes are associated with which content portions may be made manually, by a human, and/or automatically by a computer. In the latter case, the computer may be configured to recognize optical and/or audio features in the content in order to determine how the content should be divided into portions and/or to automatically assign optically-readable codes to the various portions.

Thus, in general, the network server and/or the content consumption device may be configured to provide on-demand context-based optically readable codes, where the optically readable code depends upon which content, or portion thereof, is currently being presented to the user of the content consumption device. FIG. 7 is a flowchart of an example set of steps that may be performed by such a network server and/or content consumption device that provides on-demand and/or contextually-generated optically readable codes. At step 701, the content consumption device may be currently presenting (e.g., displaying), or causing to be presented, content to the user. The content may already be stored, for example, locally by the content consumption device (e.g., in the case of the content consumption device being a DVR). Alternatively, the content may be actively streaming from the service provider (e.g., along line 101) to the content consumption device while the content is being consumed by the user. In the latter case, at least some of the content may further be locally buffered and/or recorded by the content consumption device while the content is being presented to the user. In either case, at step 702, while the content is being presented to the user, the server and/or content consumption device may determine that a local user input has been received. For example, the user might press button 302 of remote 300 (where remote 300 is in communication with or part of the content consumption device).

In response to detecting the user input, at step 703, the server and/or content consumption device may determine which optically readable code is to be displayed based on the status of the content consumption device. For instance, the status of the content consumption device may include which content, and/or which portion thereof, is currently being presented to the user. As will be discussed below with regard to FIGS. 12 and 14, the status may additionally or alternatively include an identity of the content consumption device and/or an operating status of the content consumption device, such as an error condition experienced or otherwise detected by the content consumption device.

To determine which contextual optically readable code(s) to display on demand, the content consumption device may utilize locally-stored information and/or information requested from the service provider network. For example, the content consumption device may receive data from the service provider network representing data (e.g., a table) associating timestamps or timestamp ranges (or other content portions) of the video being displayed with optically readable codes. In such a case, each optically readable code may have a unique identifier, and so the table for the content being consumed (and/or for other content) may associate time stamps or timestamp ranges with the identifiers. There may be a table for each item of content. If the content includes timestamp data, then the content consumption device may use the table to determine the optically readable code to be displayed based on the timestamp of the portion of the content being presented to the user at the time that the user input is received. The optically readable code may contain information relevant to a particular portion of and/or location within the content. The content consumption device may then retrieve the determined optically readable code(s) from local storage or by sending a request to the service provider network (where the request is directed to, e.g., the content server 106 or the application server 107) indicating the determined optically readable code identifier(s) and receiving the appropriate optically readable code(s) in return (e.g., from the content server 106 or the application server 107).

Alternatively, where the content consumption device does not have local access to such a table or other associating data, the content consumption device may send a request (where the request is directed to, e.g., the content server 106 or the application server 107) indicating the time of the user input and/or the currently presented content to the service provider network. In return, the service provider network may provide the optically readable code(s) associated with the indicated time and/or content. Or, where the request simply indicates the existence of the user input (and/or and identification of the content being presented), the service provider network may determine the time the request is received and return the associated optically readable code(s) to the content consumption device.

In still further embodiments, the optically readable codes may be included in the data stream of the content itself, or in another data channel received simultaneously with the content. For example, as new optically-readable codes become relevant over the different portions of the content being presented (e.g., displayed), those optically-readable codes (and/or identifiers of those optically-readable codes) may be embedded in the content data and/or in associated parallel real-time data. In these cases, to determine the appropriate optically-readable code(s), the content consumption device may read the current optically-readable code (and/or the identifier thereof) directly from the content data and/or from the parallel real-time data channel.

Thus, depending upon the particular embodiment, at step 704, the content consumption device may obtain the determined optically readable code(s) from local storage or from the service provider via the service provider network.

Regardless of how the optically readable code(s) is/are obtained, at step 705, the content consumption device may display (or cause to be displayed) the context-sensitive optically readable code to the user. The optically readable code may be displayed simultaneously with the content, such as in an overlay configuration or in a side-by-side configuration where the content includes video content. Alternatively, the optically readable code may be displayed instead of the video content, where the video content may continue or be automatically paused. The optically readable code may continue to be displayed until, for example, the optically readable code has been displayed for a predetermined period of time (e.g., until a timeout has occurred), or responsive to the user providing an appropriate user input indicating that the optically readable code should no longer be displayed, or responsive to the user selecting a different item of content to be presented.

Figure 8:
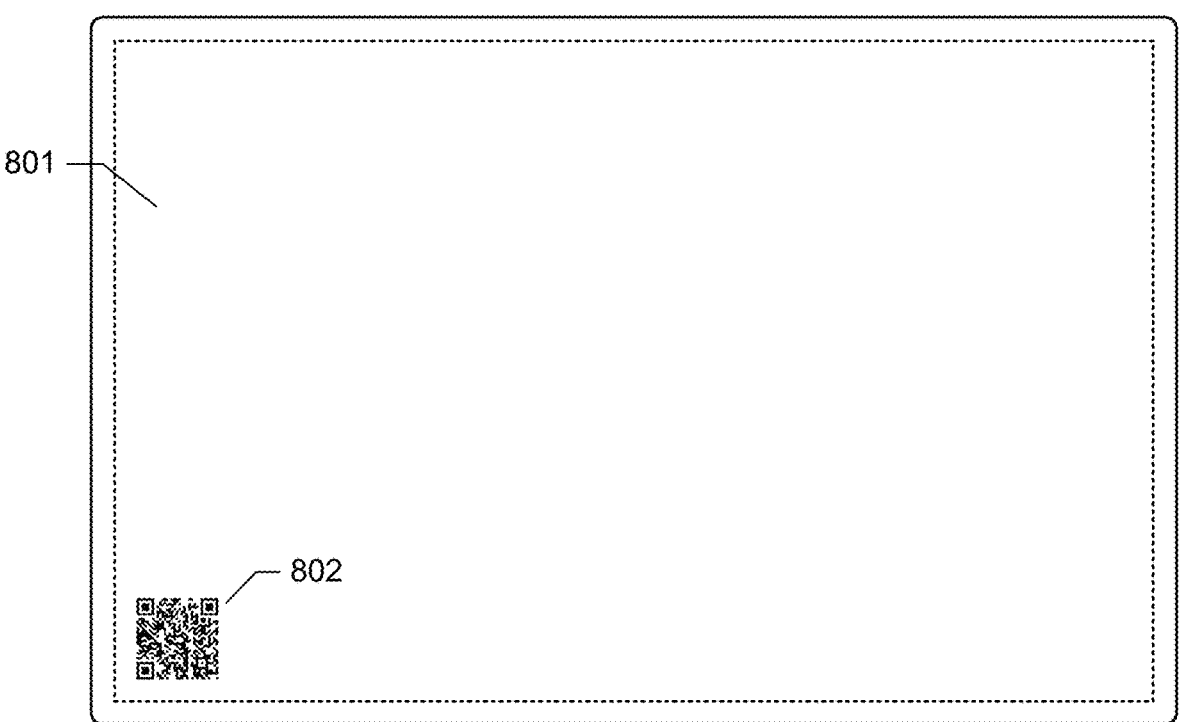
FIG. 8 is another example screen shot that may be displayed in accordance with one or more aspects as described herein.

FIG. 8 shows an example of how an on-demand (e.g., requested) and/or context-sensitive (e.g., time dependent/sensitive) optically readable code may be displayed. In this example, the content consumption device or the display device presents video content 801, when the user input is received by the content consumption device. The content consumption device may, in response, determine the contextually appropriate optically readable code, and display it such as in an overlay manner. An example of this is shown in which optically readable code 802 is displayed as an overlay over the video content 801. As previously discussed, there are other possible ways to display the optically readable code 802, such as in a side-by-side format with the video content 801, and/or to temporarily remove the display of the video content 801 while the optically-readable code 802 is being displayed.

Figure 9:
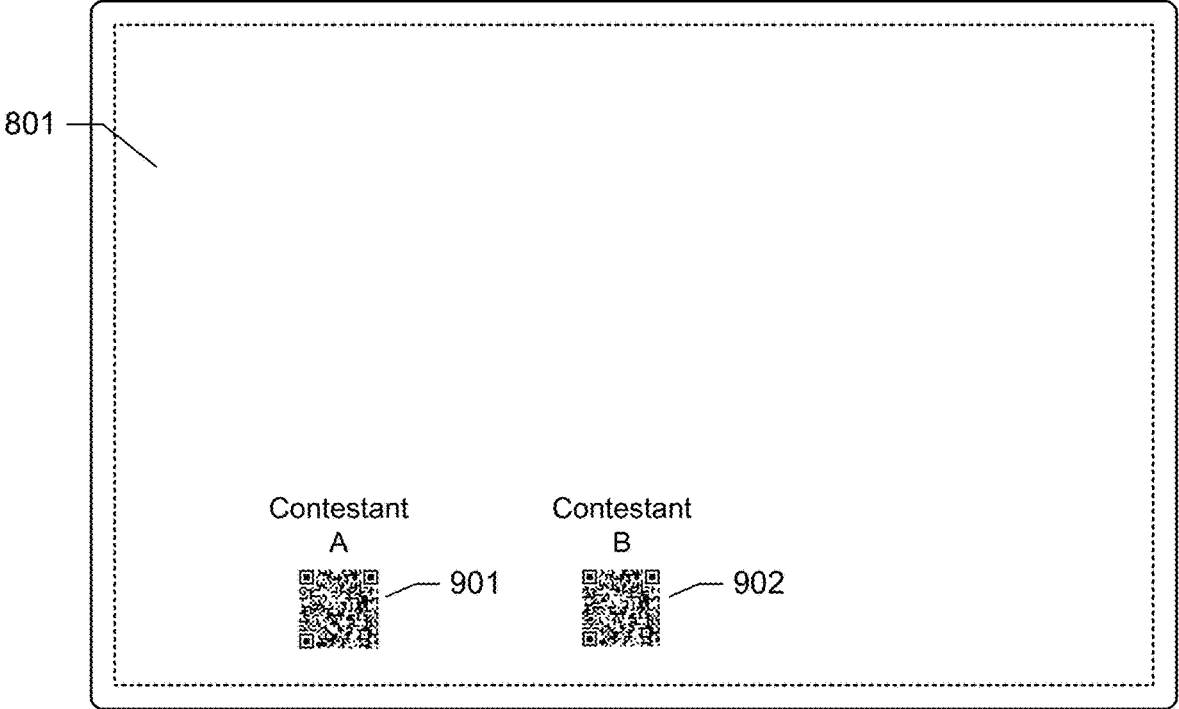
FIG. 9 is yet another example screen shot that may be displayed in accordance with one or more aspects as described herein.

FIG. 9 shows another example of how multiple on-demand (e.g., requested) and/or context-sensitive optically readable codes may be simultaneously displayed. In this example, the content consumption device is again causing the display device to display the video content 801, when the user input is received by the content consumption device. The content consumption device may, in response, determine the contextually appropriate optically readable codes, and display these codes such as in an overlay manner. An example of this is shown in which optically readable codes 901 and 902 are displayed as an overlay over the video content 801. Again, this is merely an example, and the codes 901 and 902 may be displayed in a variety of other ways. Also in this example, it can be seen that a text label is displayed adjacent to each optically-readable code 901, 902, to indicate what each optically-readable code represents. In this case, the labels indicate that the two optically-readable codes 901, 902 represent a different one of two contestants (where, e.g., the video content 801 is a competition between Contestant A and Contestant B). The labels may additionally or alternatively include other information, such as graphical and/or animated information.

Figure 10:
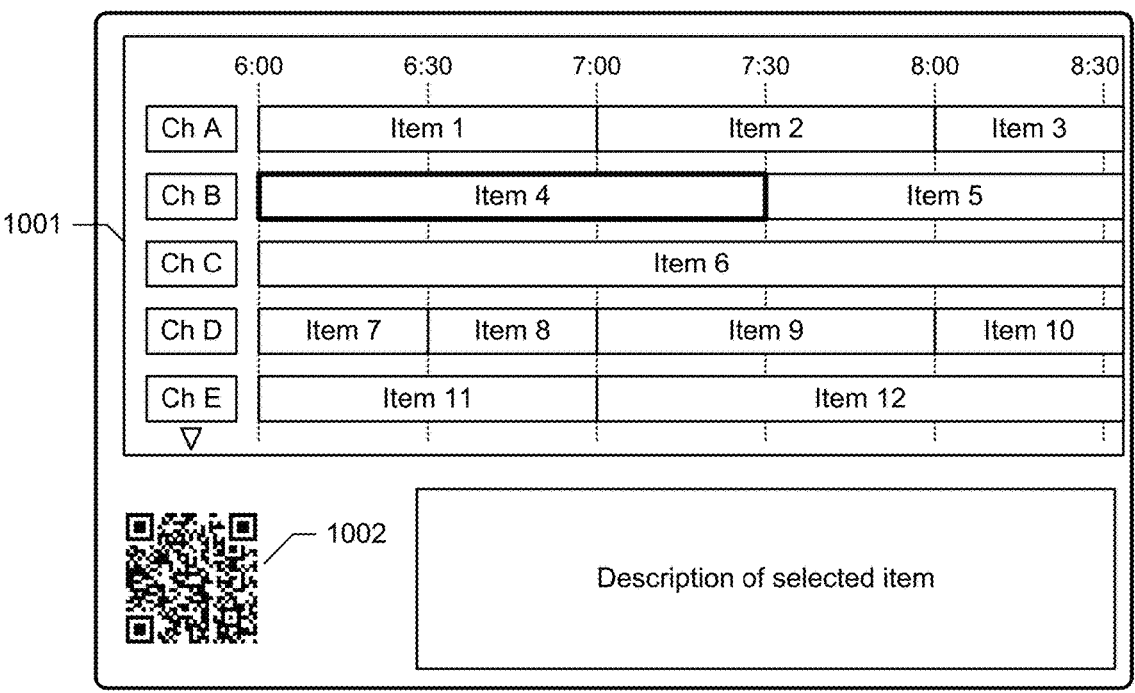
FIG. 10 is still another example screen shot that may be displayed in accordance with one or more aspects as described herein.

FIG. 10 is another example screen shot of information that may be displayed by the content consumption device in conjunction with an optically-readable code. In this example, a schedule 1001 of content items is displayed. Such a schedule is sometimes referred to as a program guide. Typically, the user can interact with a program guide such as this by selecting an item of content and requesting that the item be recorded or presented (e.g., displayed), or to obtain further information about the selected item. In the present example, twelve items of content (Item 1 through Item 12) are shown, and Item 4 is presently selected. An optically-readable code 1002 may further be displayed that corresponds to the selected item, and may be formatted in any of the manners discussed herein. For example, the optically-readable code 1002 may represent a URI including parameters that in turn represent parameters in a database query. Moreover, the optically-readable code 1002 may be displayed automatically upon selection of an item of content, or it may be displayed on-demand only responsive to a specific user input requesting that the optically-readable code 1002 be displayed. The latter may be desirable where it is not efficient to always set aside screen real estate for the optically-readable code 1002, especially where some users may not often utilize such a code.

Figure 11:
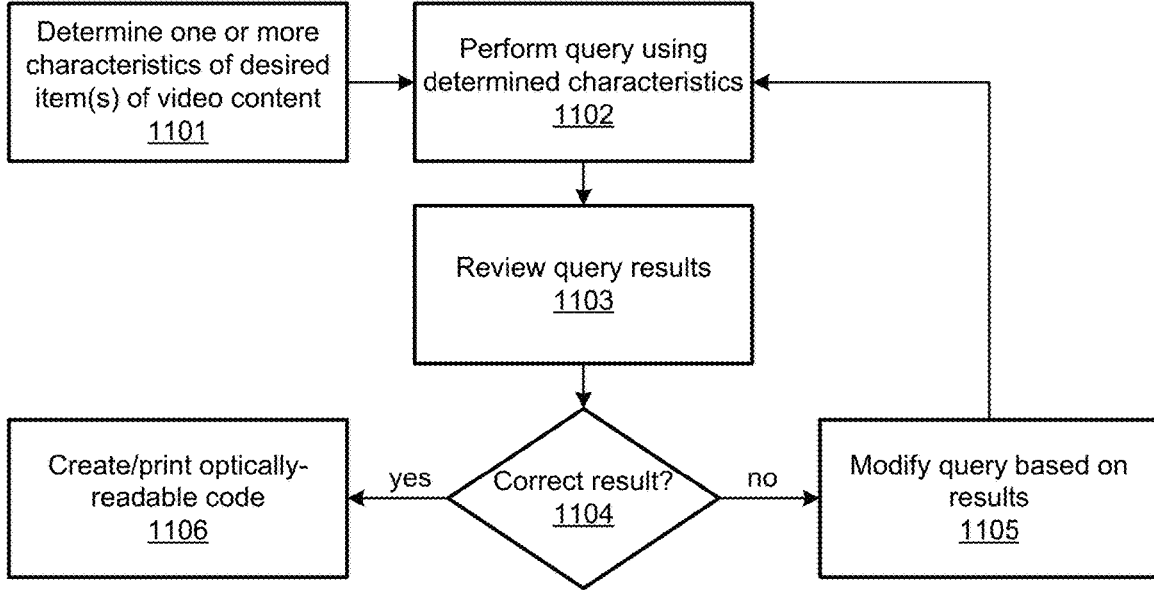
FIG. 11 is another flow chart of example steps that may be performed in accordance with one or more aspects as described herein.

In any of the above-described example embodiments, an advertiser or other entity may desire to create the optically-readable code so that it is sufficient to initiate the appropriate database query. This may be done in a number of ways, including on a trial-and-error basis. FIG. 11 shows example steps that may be performed by an advertiser or other entity to determine and create an optically-readable code. Some or all of the steps of FIG. 11 may be performed manually, by a human, and/or by a computer executing software.

At step 1101, the entity may determine one or more characteristics of the desired item(s) of content. For example, the entity may desire that the optically-readable code include a query leading to a result that includes a particular television series. The characteristics may include one or more of, for instance, the title of a desired item of content, a key word, a content type (e.g., television program, series, movie, on-demand content), a length or range of lengths, a start time or range of start times (which may include date, day, week, month year, and/or time of day), a frequency of showings or set of frequencies of showings (e.g., weekly, monthly), a rating or set of ratings (e.g., G rated, PG-13 rated), a channel or set of channels, a content provider or set of content providers (e.g., NBC, CBS, HBO), a search time range, and a maximum number of results. These are merely examples; other characteristics of the desired item(s) of content may additionally or alternatively be used to determine the query.

Next, at step 1102, the entity may perform a query of the above-described database by, e.g., generating a URI including parameters representing parameters of the query, and sending a message containing the URI to the web server 119 via a network. The web server 119 may return results of the query back to the entity, and at step 1103, the entity may review the results.

If it is determined at step 1104 that the results are as expected (e.g., the results identify the desired item(s) of content), then the query may be considered to return the correct results, and so the process may move to step 1106. At step 1106, the entity may create an optically-readable code that encodes the previously-determined URI including the parameters. The optically-readable code may be stored as data on a computer-readable medium and/or visibly printed onto a physical substrate such as a billboard, magazine, newspaper, or book (e.g., using ink, toner, or another substance). Additionally or alternatively, data representing the optically-readable code may be sent to a display device so that the optically-readable code may be displayed (such as in step 705 of FIG. 7).

If it is determined at step 1104 that the results are not as expected, then at step 1105 the query may be modified to further narrow or broaden the query, or to change the query in other ways. For instance, it may be realized that too many search results are provided, and that one or more additional query parameters should be added. The process may then move back to step 1102 in order to execute the new query and to subsequently analyze the results thereof in step 1103.

As discussed previously, the interface 120 or content consumption device may be controlled by a remote control device, such as remote control 300. In some situations, it may be desirable to pair a particular remote control device with a particular network access device (e.g., interface 120) and/or a particular content consumption device, so that the remote control device is authorized to control that device. Pairing in general of a device with its remote control is known, and may be done, for instance, by having a user enter a secret authorization code into the remote control, where the authorization code is provided by the device to be controlled. However, this type of device pairing is not always user-friendly, can be inconvenient, and is error-prone due to the human input that is normally required. Another way to pair devices is proposed, where one of the devices is able to cause information to be displayed (such as on a television or other display device) and the other of the devices is able to view the displayed information (such as via a camera). For instance, the device to be controlled (e.g., a content consumption device) may display an optically readable code representing specific information, and the remote control device may read the optically readable code and use the specific information to pair the remote control device with the device to be controlled. An example of such a process is described with respect to the flow chart of FIG. 12.

In the example of FIG. 12, a user device such as remote control 300 or cellular phone 116B may be paired with a content consumption device or one or more other devices as follows. At step 1201, the user device may send a request to the content consumption device for a device status code. This may be instigated by, for instance, the user commanding the user device to send such a request. In response, the process moves to step 1202. Alternatively, the content consumption device may perform step 1202 without waiting for a request from the user device. For instance, the user may command the content consumption device to begin performing step 1202, such as by selecting a pairing function on the content consumption device.

At step 1202, the content consumption device may determine a status of itself, and determine status information from the status. The status information may include, for example, an identifier of the content consumption device. The identifier may be, for instance, a network address such as an IP address, MAC address, and/or serial number. The status information may further include a power status of the content consumption device, such as whether the content consumption device is currently in an "on" or "standby" state. The status information may further include which one or more channels, frequencies, programs, content, and/or streams that the content consumption device is currently displaying or otherwise presenting, tuned to, recording, or otherwise receiving. The status information may further include a password or other secret key that is not normally publicly shared and that is uniquely associated with the content consumption device and/or with a particular user of the content consumption device. The status information may include only one or another subset of these items of information, and/or it may include completely different information. Whatever the status information is for a particular embodiment, the status information may be displayed in a format that is understandable by the user device. For example, the status information may be encoded into an optically-readable code, which may then be displayed (step 1203) on a display device, such as television 112, a computer monitor, or any other display device.

An example of an optically readable code that may be generated at step 1203 is shown in FIG. 13. The example optically-readable code of FIG. 13 may represent the following status information:

MAC Address: AE68FF
Status: On
Frequency: 192 MHz
Video PID: 198
Audio PID: 17
Transport Stream ID: 1234

At step 1204 of FIG. 12, the user device may read the displayed optically readable code, such as by using a camera of the user device. At step 1205, the user device may decode the optically readable code to obtain the status information, and configure itself in a manner based on some or all of the status information. Configuring may involve, for instance, storing some or all of the status information in memory, and/or executing instructions causing the user device to utilize some or all of the status information when interacting with the server such as in step 1205. The user device may now have sufficient information to be paired with the content consumption device. In other words, the user device may have sufficient information to be able to successfully control one or more functions of the content consumption device that would otherwise not be controllable without that information. For instance, the content consumption device (or any intermediate device such as a server) may ignore certain commands from the user device unless the user device is authorized, such as by including with those commands an indication of the identifier (e.g., MAC address) of the content consumption device, or unless the command includes the key.

The user device may now be authorized to command the content consumption device via the network. To do so, at step 1206, the user device may interact with the server, such as by sending a message to the server requesting that the content consumption device perform some function, such as changing the channel, recording a show, turning on, turning off, pausing, playing, fast forwarding, rewinding, displaying a list of recorded content, displaying an electronic program guide, etc. The message may include the above-mentioned indication indicating that the user device is authorized to control the content consumption device. Additionally or alternatively, the user device may directly control the content consumption device.

In response to the message from the user device, at step 1207, the server may generate and send an appropriate command to the content consumption device, based on the message received from the user device. At step 1208, the content consumption device may act on the command (e.g., by performing the requested function).

As previously discussed, the content consumption device may generate and display an optically readable code indicating a status of the content consumption device. The status may include, for example, an error condition experienced by and/or otherwise detected by the content consumption device. In such a case, the content consumption device may be configured to generate and display an optically readable code indicating the particular error condition, such as by an error code or other identifier of a particular error condition. Error conditions that may trigger display of an associated optically readable code may be indicative of problems experienced by the content consumption device, such but not limited to, loss of network connectivity (upstream and/or downstream), poor quality signal, failed hardware (e.g., a failed hard drive) of the content consumption device, failed functionality of the content consumption device, overheating, incorrect connectivity to other devices, failed response from other connected devices, outdated firmware and/or software, low battery state, loss of external power, and the like. The error condition may additionally or alternatively be indicative of a problem experienced by the user of the content consumption device, even though the device may be operating and/or connected as designed, such as but not limited to, inappropriate user input such as incorrect password entry, improper menu selection, and the like.

The displayed optically readable code may be read such as in the manners previously described (e.g., using a user device such as a cell phone or other device having a camera). The user device may then interact with a server or other device by providing the server with an indication of the error condition represented by the optically readable code. In turn, the server may communicate helpful information to the user about the error condition, and/or the server may send a command to the content consumption device, in an effort to correct the error condition and/or to obtain further information about the error condition.

Figure 14:
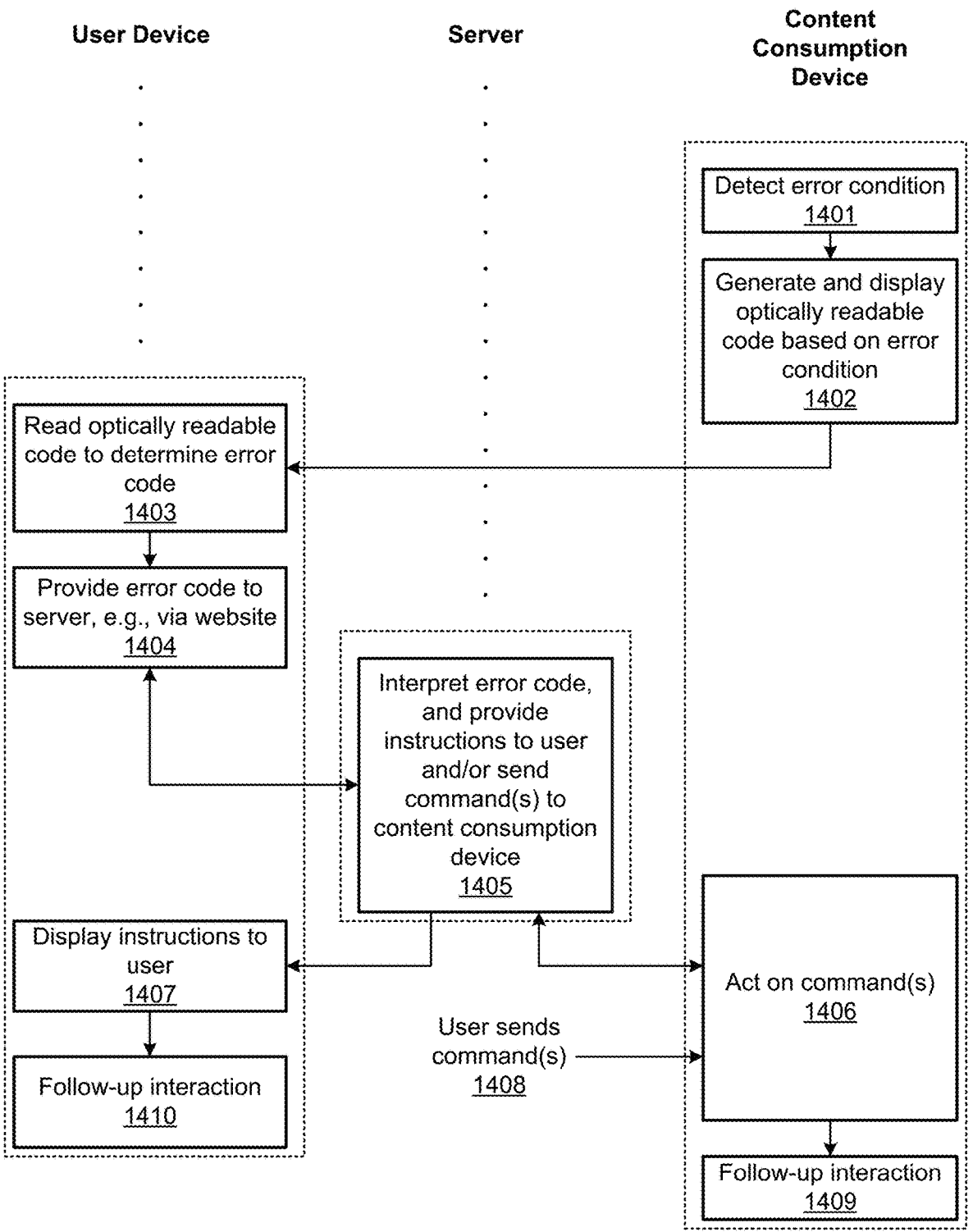
FIG. 14 is another flow chart of example steps that may be performed in accordance with one or more aspects as described herein.

FIG. 14 is a flow chart of illustrative steps that may be performed to accomplish one or more of the above-described features. At step 1401, a component in the network, such as the content consumption device, may detect the occurrence of an error condition (such as one of the error conditions listed above, or any other error condition). At step 1402, responsive to detecting the error condition, the network component (e.g., the content consumption device) may generate and display an optically readable code to the user, where the optically readable code is formatted so as to encode or otherwise represent an indication of which error condition has occurred and/or other information related to the error. Or, in the case of another network component, the network component may transmit the optically readable code to the content consumption device for display to the user. For example, where each error condition has a predetermined identifier (e.g., error code), the optically readable code may represent at least the predetermined identifier for that error condition. The optically readable code may further represent a website address. For example, the optically readable may represent information such as: https://secure.api.company.com/errors/searchValue=12345. In this case, the optically readable code may represent a particular website and path, and a particular error condition having a predetermined error code of 12345. Rather than displaying the optically readable code responsive to detecting the error condition, the content consumption device may display the optically readable code in response to an external request, such as in response to user input and/or in response to a request from a network or externally-connected device.

At step 1403, the user device may be utilized to read (e.g., take a picture of) the displayed optically readable code. At step 1404, the user device may decode the optically readable code to obtain information encoded therein. Where the information represents a website or portion thereof, the user device may use a web browser of the user device to browse to the indicated website location. Alternatively, the user device may communicate with a server without the use of a web browser, by sending the server or another network component the error code represented by the optically readable code (e.g., to be interpreted by the server or another network component).

Thus, at step 1405, the server (e.g., a computing device such as the web server 119, application server 107, and/or another server), may receive the error code and may determine how to proceed based on the error code. For example, the server may determine, based on the error code, that instructions or other information may be provided to the user device for display by the user device (step 1407), such as via the web browser or a specialized software application of the user device. The information may include, for example, step-by-step instructions as to how to correct the error condition (e.g., by providing certain input to the content consumption device, or by rebooting the content consumption device, or by asking the user to provide further information about the circumstances of the error condition), and/or the information may include helpful information such as a description of the meaning of the error condition and what may be causing the error condition. As appropriate, the user may provide one or more commands (step 1408) to the content consumption device, such as in the form of direct user input, upon the advice of the information provided by the server. The user may also perform subsequent interactions with the user device (step 1410). In addition or alternatively, the server may send one or more commands directly to the content consumption device (e.g., via links 101) in an effort to correct the content consumption device and/or obtain further information about the error condition (e.g., by pinging the content consumption device, sending a firmware update, or causing the content consumption device to reboot). The content consumption device may further provide feedback to the server as to the success or failure, or other status, of the attempts to correct the error condition.

At step 1406, the content consumption device may act upon the one or more commands provided by the server and/or the user. This may involve, for example, downloading a firmware update, or rebooting, or changing an internal setting. This may further involve the content consumption device providing feedback to the user as to the success or failure, or other status, of the attempts to correct the error condition, such as by displaying the feedback. At step 1409, the user may follow up with further interaction with the content consumption device, as appropriate.

Other variations on using an optically readable code are possible. For example, a user may use an optically readable code to access content on a content consumption device that is not necessarily associated with the user and not necessarily accessible without a subscription, registration, or other service agreement. For instance, the user may have a subscription account with a content provider to be able to consume content at the user's home device, mobile device, and/or other device registered to the user. However, if the user is traveling or otherwise does not have access to the user's home device, the user could consume the content on an alternate content consumption device such as another television, computer, mobile device, gaming device, tablet, etc. that may not be registered to the user with the content provider. The user may do so by, for example, invoking an optically readable code to appear on the other content consumption device, and using the user's registered mobile device to read the optically readable code. The content provider may be able to partially or fully authenticate the user based on a confirmation that the user's registered mobile device successfully read the optically readable code. This may imply that the user actually has access to both the user's registered mobile device and the alternate content consumption device, providing a level of trust that the user is, in fact, who he or she says that the user is. The ability to access restricted content on a content consumption device not normally associated with the user may be useful where, for instance, the user is visiting the house of a friend or relative, or where the user is staying in a hotel. In the first case, the alternate content consumption device may be, e.g., a device owned or otherwise controlled by the friend or relative. In the second case, the alternate content consumption device may be, e.g., a device owned or otherwise controlled by the hotel.

For example, say that a user is on a trip and is staying in a hotel. The hotel may provide a content consumption device (e.g., an Internet-enabled television or computer) in each hotel room. In this example, the hotel-provided content consumption device would be the alternate content consumption device. For purposes of this example, it will be assumed that the hotel-provided content consumption device is an interactive Internet-enabled television set. The user may access the service provider's server (e.g., browse to a web site) using the hotel's television set to login to the user's account and cause an appropriate optically-readable code to be presented on the hotel's television set. The user may then use the user's cell phone, tablet computer, or other mobile device known to the service provider and having a camera to take an image of the displayed optically-readable code. The user's mobile device may then use the information from the imaged optically-readable code to authenticate the hotel's television set for the current viewing session. By doing so, the service provider will be assured that an authorized user is actually in the vicinity of the hotel's television set, and the service provider may then provide requested content to the hotel's television set that might otherwise be restricted from being viewed without an agreement (e.g., subscription) between the user and the service provider.

Figure 15:
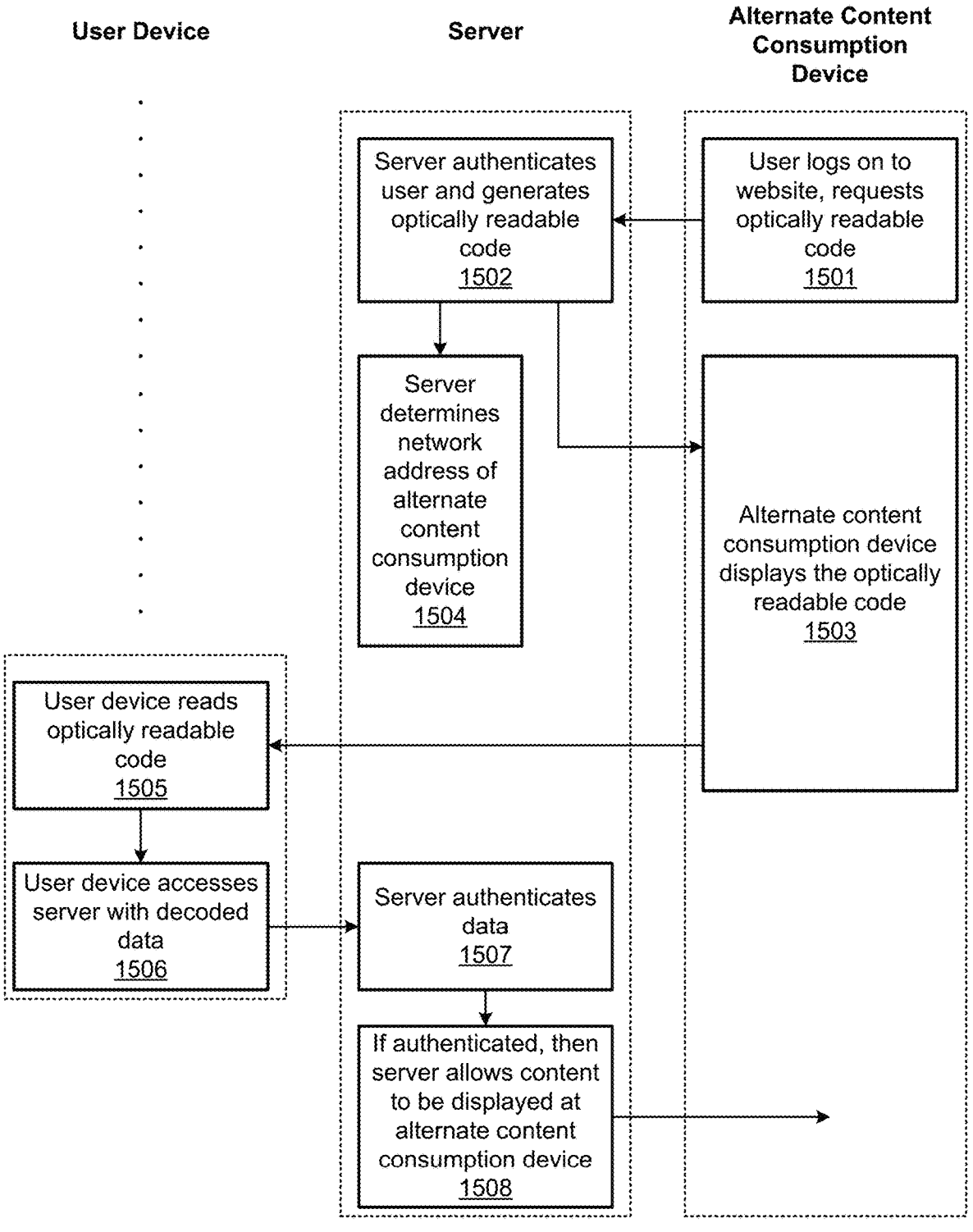
FIG. 15 is yet another flow chart of example steps that may be performed in accordance with one or more aspects as described herein.

An example of how this process may work is described with reference to FIG. 15. At step 1501, the user may use the alternate content consumption device to request an optically readable code. This may involve, for instance, the user logging in to a web site controlled or otherwise associated with the content provider and requesting an optically readable code and/or to consume content on the alternate content consumption device. The web site may be hosted by, for example the web server 119 or the application server 107). For example, the user may enter a user ID and/or a password to identify the user and/or the user's account. At step 1502, a server of the content provider (e.g., the server 119 or 107) may authenticate the user based on the log-in process and generate an optically readable code. At step 1503, the server may cause the optically readable code to be displayed by the alternate content consumption device, such as via the displayed web page of the web site and/or an information display screen. The optically readable code may be generated in any of a number of ways, such as randomly or selected from a predetermined set of optically readable codes. For example, the optically readable code may identify a predetermined web site address (which may or may not be the same for all of the optically readable codes) and may further include one or more parameters and/or a secret (such as a PIN or one-time password). The parameters and/or the secret may be randomly selected or selected from a predetermined set of parameters. Additionally or alternatively, the parameters and/or the secret may be at least partially based on information about the user and/or the user's account, such as the user's name and/or account number, and/or based at least partially on the network address of the alternate content consumption device (as may be determined at step 1504, especially if step 1504 is performed prior to or simultaneously with step 1502 and/or step 1503).

At step 1504, the server may also determine a network location of the alternate content consumption device, such as the IP address and/or MAC address of the alternate content consumption device and/or of a local network that includes the alternate content consumption device. Step 1504 may be performed in a different sequence relative to the other steps, such as prior to and/or simultaneously with step 1502 and/or step 1503, or after or simultaneously with step 1507.

At step 1505, the user device (such as the cellular phone 116A or the cellular phone 116B) may be used to read and decode the displayed optically readable code, such as by using a camera of the user device. At step 1506, the user device may transmit data representing the decoded information to the server or otherwise utilize the data to access the server or a different server. For instance, where the decoded information represents a web site hosted by the server (or a different server) and/or supplemental information such as parameters, the user device may use a web browser or other software application to access the indicated web site and pass any such parameters to the server hosting the web site. The decoded data may include, for instance, an indication of the identity of the mobile device, an identity of the user, and identity of the user's account with the content provider, and/or a secret as discussed previously.

At step 1507, the server (e.g., a computing device in a network) may authenticate the information provided by the user device and/or may authenticate the user device itself. This authorization may include, for example, determining whether the data sent by the user device at step 1506 is related to (e.g., the same as or otherwise based on) the data represented by the optically readable code. As an example, the optically-readable code may include data representing the above-mentioned secret. Thus, if the data sent by the user device at step 1506 includes the secret, then this may result in successful authentication at step 1507. If authentication is successful, then the server may assume that the user of the registered user device is located proximate to the alternate content consumption device. If so, then at step 1508 the server may perform further processing to allow selected content to be sent to (e.g., streamed to) and displayed or otherwise presented by the alternate content consumption device. The content may be selected, e.g., by the user via the alternate content consumption device and/or via the user device. Moreover, such content may be viewable or otherwise consumable using the alternate content consumption device until the user disables the alternate content consumption device, logs out of the web site, and/or after a predetermined window of time. For instance, the authorization to present content by the alternate content consumption device may be limited to a certain type of content and/or a certain time period, such as twelve hours, or twenty-four hours, after which time the alternate content consumption device may no longer present restricted content without being successfully re-authorized.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present disclosure.

The invention claimed is:

1. A method comprising:
   outputting, by a computing device and to assist a user device in communicating with the computing device, an optically-readable code that is based on status information associated with the computing device;
   receiving, from the user device, a command comprising at least a portion of the status information; and
   executing the command.

2. The method of claim 1, wherein the status information comprises one or more of: one or more instructions to configure the user device to communicate with the computing device, an identifier, a network address, an Internet Protocol (IP) address, a Media Access Control (MAC) address, a serial number, a power status, packet identifier, video identifier, audio identifier, transport stream identifier, channel information, frequency information, stream information, display information, tuner information, recording information, a password, or a key.

3. The method of claim 1, further comprising:
   generating the optically-readable code by encoding the status information into the optically-readable code.

4. The method of claim 1, wherein the outputting the optically-readable code is based on receiving a request from the user device to pair with the computing device.

5. The method of claim 1, further comprising:
   receiving, from a second user device, a second command; and
   based on the second command lacking the status information, failing to execute the second command.

6. The method of claim 1, further comprising:
   receiving, by the computing device and from the user device, a request for an optically readable code; and
   based on receiving the request, determining the status information.

7. The method of claim 1, further comprising:
   causing, based on the optically-readable code, configuration of the user device.

8. A computing device comprising:
   one or more processors; and
   memory storing instructions that, when executed by the one or more processors, cause the computing device to:
      output, to assist a user device in communicating with the computing device, an optically-readable code that is based on status information associated with the computing device;
      receive, from the user device, a command comprising at least a portion of the status information; and
      execute the command.

9. The computing device of claim 8, wherein the status information comprises one or more of: one or more instructions to configure the user device to communicate with the computing device, an identifier, a network address, an Internet Protocol (IP) address, a Media Access Control (MAC) address, a serial number, a power status, packet identifier, video identifier, audio identifier, transport stream identifier, channel information, frequency information, stream information, display information, tuner information, recording information, a password, or a key.

10. The computing device of claim 8, wherein the instructions, when executed by the one or more processors, further cause the computing device to:
   generate the optically-readable code by encoding the status information into the optically-readable code.

11. The computing device of claim 8, wherein the instructions, when executed by the one or more processors, cause the computing device to:
   output the optically-readable code by outputting the optically-readable code based on receiving a request from the user device to pair with the computing device.

12. The computing device of claim 8, wherein the instructions, when executed by the one or more processors, further cause the computing device to:
   receive, from a second user device, a second command; and
   based on the second command lacking the status information, fail to execute the second command.

13. The computing device of claim 8, wherein the instructions, when executed by the one or more processors, further cause the computing device to:
   receive, from the user device, a request for an optically readable code; and
   based on receiving the request, determine the status information.

14. The computing device of claim 8, wherein the instructions, when executed by the one or more processors, further cause the computing device to:
   cause, based on the optically-readable code, configuration of the user device.

15. One or more non-transitory computer-readable media storing instructions that, when executed, cause:
   outputting, by a computing device and to assist a user device in communicating with the computing device, an optically-readable code that is based on status information associated with the computing device;
   receiving, from the user device, a command comprising at least a portion of the status information; and
   executing the command.

16. The one or more non-transitory computer-readable media of claim 15, wherein the status information comprises one or more of: one or more instructions to configure the user device to communicate with the computing device, an identifier, a network address, an Internet Protocol (IP) address, a Media Access Control (MAC) address, a serial number, a power status, packet identifier, video identifier, audio identifier, transport stream identifier, channel information, frequency information, stream information, display information, tuner information, recording information, a password, or a key.

17. The one or more non-transitory computer-readable media of claim 15, wherein the instructions, when executed, further cause:
   generating the optically-readable code by encoding the status information into the optically-readable code.

18. The one or more non-transitory computer-readable media of claim 15, wherein the instructions, when executed, cause the outputting the optically-readable code by causing outputting the optically-readable code based on receiving a request from the user device to pair with the computing device.

19. The one or more non-transitory computer-readable media of claim 15, wherein the instructions, when executed, further cause:

receiving, from a second user device, a second command; and based on the second command lacking the status information, failing to execute the second command.

20. The one or more non-transitory computer-readable media of claim 15, wherein the instructions, when executed, further cause:

receiving, by the computing device and from the user device, a request for an optically readable code; and based on receiving the request, determining the status information.

21. The one or more non-transitory computer-readable media of claim 15, wherein the instructions, when executed, further cause:

causing, based on the optically-readable code, configuration of the user device.

* * * * *